United States Patent
Huh et al.

(10) Patent No.: US 9,335,925 B2
(45) Date of Patent: May 10, 2016

(54) METHOD OF PERFORMING KEYPAD INPUT IN A PORTABLE TERMINAL AND APPARATUS

(71) Applicant: Samsung Electronics Co., Ltd., Gyeonggi-do (KR)

(72) Inventors: Jung-Chul Huh, Seoul (KR); Liang Han, Tianjin (CN)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/051,954

(22) Filed: Oct. 11, 2013

(65) Prior Publication Data

US 2014/0104170 A1  Apr. 17, 2014

(30) Foreign Application Priority Data

Oct. 12, 2012 (CN) .......................... 2012 1 0384739

(51) Int. Cl.
*G09G 5/00* (2006.01)
*G06F 3/0488* (2013.01)

(52) U.S. Cl.
CPC .................................. *G06F 3/04886* (2013.01)

(58) Field of Classification Search
CPC ... G06F 3/03547; G06F 3/017; G06F 3/0482; G06F 3/04817

USPC ............... 345/156, 168, 173–178; 455/556.1, 455/556.2, 566; 715/773
See application file for complete search history.

(56) References Cited

U.S. PATENT DOCUMENTS

| | | | |
|---|---|---|---|
| 8,619,034 B2 * | 12/2013 | Grad | 345/168 |
| 2004/0041723 A1 * | 3/2004 | Shibamiya et al. | 341/176 |
| 2004/0066405 A1 | 4/2004 | Wessler et al. | |
| 2008/0284744 A1 | 11/2008 | Park et al. | |
| 2010/0085317 A1 * | 4/2010 | Park et al. | 345/173 |
| 2011/0169749 A1 * | 7/2011 | Ganey et al. | 345/173 |
| 2013/0132904 A1 * | 5/2013 | Primiani | G06F 3/04886 715/834 |

FOREIGN PATENT DOCUMENTS

| | | |
|---|---|---|
| CN | 201025514 Y | 2/2008 |
| CN | 101290555 A | 10/2008 |
| CN | 201628932 U | 11/2010 |
| CN | 201781558 U | 3/2011 |
| CN | 102035934 A | 4/2011 |
| CN | 102109960 A | 6/2011 |
| JP | 2002-207556 A | 7/2002 |

* cited by examiner

*Primary Examiner* — Jennifer Nguyen
(74) *Attorney, Agent, or Firm* — Cha & Reiter, LLC.

(57) ABSTRACT

A method for performing keypad input in a portable terminal is provided. The method includes displaying, on a touch screen, a keypad and an operating zone; detecting a first user operation performed in the operating zone; identifying, by a processor, a key from the keypad, the key being identified based on the first user operation; and inputting the selected key.

14 Claims, 7 Drawing Sheets

METHOD OF PERFORMING KEYPAD INPUT IN A PORTABLE TERMINAL AND APPARATUS

CLAIM OF PRIORITY

This application claims priority under 35 U.S.C. §119(a) to a Chinese Patent Application filed in the State Intellectual Property Office on Oct. 12, 2012 and assigned Serial No. 201210384739.8, the content of which is herein incorporated by reference.

BACKGROUND

1. Technical Field

The present disclosure relates to touch input technology on, and more particularly, to a method and apparatus for inputting keys in a virtual keypad.

2. Description

With the development of information technology, various portable terminals such as mobile phones, tablet PCs, multimedia players, palm consoles, personal digital assistants (PDA), GPS navigators and remote controls, etc. have already become a necessity of peoples' daily lives. People frequently use such terminals for web surfing, information publishing, image processing, e-mail, etc.

Figure 1:
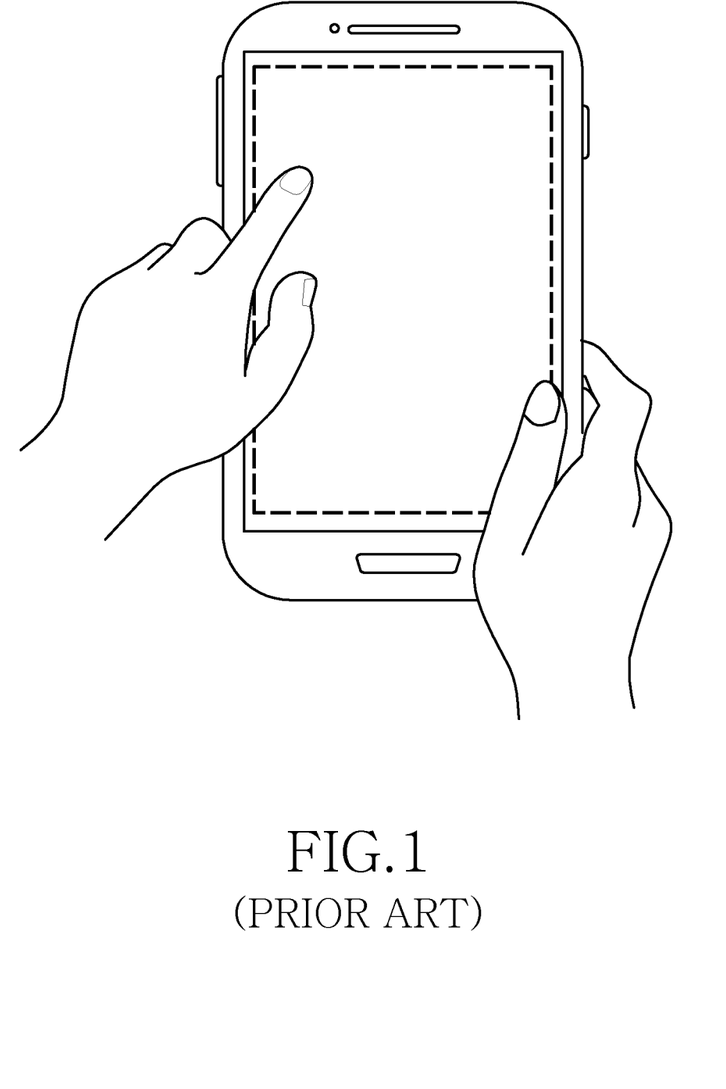
FIG. 1 is a schematic diagram depicting the operation a portable terminal by using two hands in accordance with the prior art.

To provide a better user experience, manufacturers have made the screens of portable terminals increasingly larger in size. However, increasing screen size may make the entry of information in portable terminals more difficult. When the screen of a portable terminal exceeds a certain size, it is impossible for most users to both hold the terminal and input information into the terminal with the same hand. Thus, during normal use, portable terminals with larger screen sizes require to be held with two hands in the manner illustrated in FIG. 1.

Figure 2:
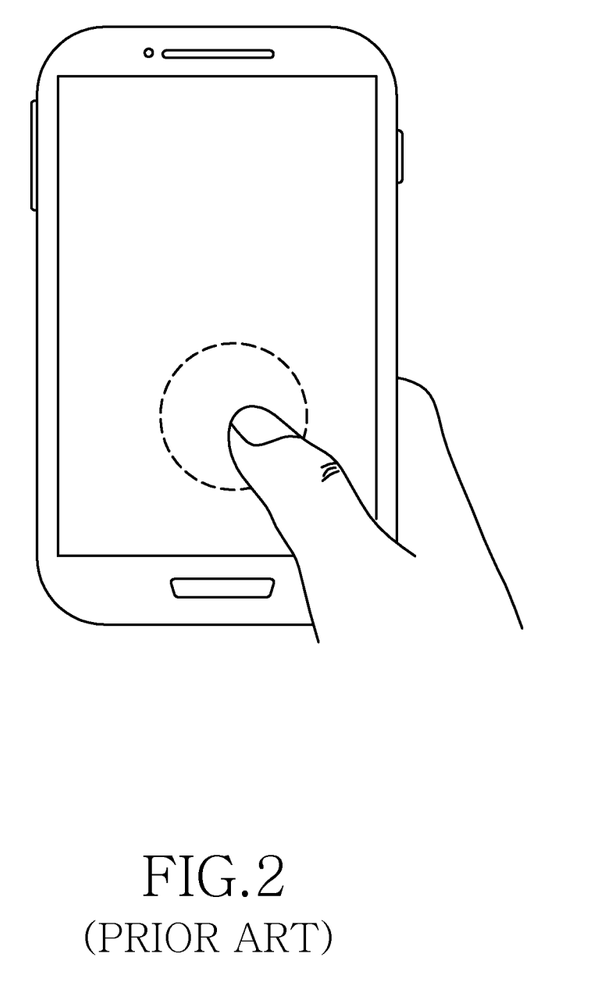
FIG. 2 is a schematic diagram depicting the operation of a portable terminal by using one hand in accordance with the prior art.

If a user were to attempt operating a large-screen portable terminal with one hand only, the user may do so by using the technique depicted in FIG. 2. Namely, the user may employ the thumb of the hand holding the terminal to interact with the terminal's touch screen while using the remaining four fingers to support the phone. However, due to the thumb's limited length, the user may experience a blind spot when interacting with the terminal's touch screen. In the example of FIG. 2, the dashed circle indicates the portion of the terminal's screen that is within reach of the user's thumb, while all other parts of the screen are out of reach.

Nevertheless, there could be situations in which users need to operate their smart phones with one hand only. For example, a user may have to use one hand to operate his or her portable terminal when the other hand is dirty, or when the user is holding the handrail on a subway or a bus. Accordingly, the need exists for techniques that permit users to operate large-screen portable terminals with one hand only.

SUMMARY

The present invention is to provide a method and apparatus for conveniently performing keypad input with one single hand in a portable terminal having a touch screen.

According to one aspect of the disclosure, a method for performing keypad input in a portable terminal includes displaying, on a touch screen, a keypad and an operating zone; detecting a first user operation performed in the operating zone; identifying, by a processor, a key from the keypad, the key being identified based on the first user operation; and inputting the identified key.

According to another aspect of the disclosure, a system for providing keypad input in a portable terminal includes an operating zone setting unit, a display unit, a sensing unit, and a control unit. The operating zone setting unit is configured to set an operating zone for operating a keypad on a touch screen. The display unit is configured to display the keypad on the touch screen along with the operating zone. The sensing unit is configured to detect a user operation performed in the operating zone. The control unit is configured to identify a key selected from the keypad based on the user operation and input the identified key.

According to yet another aspect of the disclosure, a system comprising a touch screen and a processor configured to display, on the touch screen, a keypad and an operating zone; detect a first user operation performed in the operating zone; identify a key from the keypad, the key being identified based on the first user operation; and input the identified key.

BRIEF DESCRIPTION OF THE DRAWINGS

These and/or other aspects and advantages of the present disclosure will become apparent and more readily appreciated from the following description, taken in conjunction with the accompanying drawings in which.

DETAILED DESCRIPTION

Here a detailed reference will be made to aspects of the present disclosure, of which the examples are shown in the drawings. Throughout the description, the same drawing reference numerals refer to the same components. Aspects of the present disclosure will be described below by referring to the accompany drawings, so as to explain the present disclosure.

Figure 3:
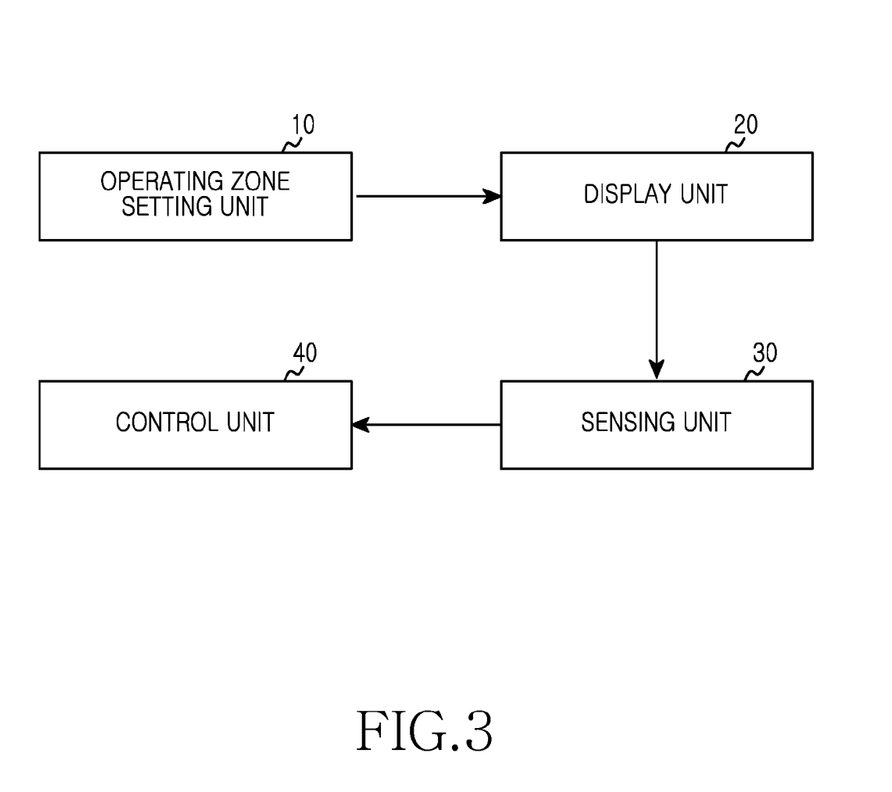
FIG. 3 is a block diagram of an apparatus for keypad input in accordance with some aspects of the disclosure.

FIG. 3 depicts a block diagram of an apparatus for keypad input. According to some aspects of the disclosure, the apparatus may be part of a portable terminal. As a non-limiting example, the portable terminal can be a mobile phone (such as a smart phone with a large screen), a tablet PC, a multimedia player, a palm console, a PDA, a GPS navigator, a remote control, etc. In some aspects, the portable terminal may include a touch screen. The touch screen may be used to display a virtual keypad for entering information.

As shown in FIG. 3, the apparatus for keypad input in the portable terminal may include an operating zone setting unit 10, a display unit 20, a sensing unit 30 and a controlling unit 40. One or more of units 10-40 may be implemented by using a touch screen display, a processor, a programmable component (such as a CPLD or FPGA), a DSP circuit, and/or any other suitable type of circuit.

The operating zone setting unit 10 (or processor thereof) may be configured to set an operating zone on the touch screen, wherein, the size of the operating zone is selected so as to allow the user to slide his thumb conveniently therein. For example, the operating zone setting unit 10 can set the size and position of the operating zone according to user preferences, thereby permitting the user to adjust the operating zone according to the size of his or her own hands. In some instances, the operating zone setting unit 10 may set the position of the operating zone at either one of the bottom-right or bottom-left side of the touch screen, so that it is conveniently accessible by both right-handed and left-handed users.

As is discussed in further detail below, in some aspects, the operating zone may permit the user to select keys located anywhere on a keypad through operations performed within the operating zone. Because the operating zone may be smaller in size than the keypad, the user may interact with operating zone by using his thumb only. Thus, the operating zone may permit one-handed input on large-screen devices that are otherwise difficult to use with one hand only.

In some aspects, the operating zone can be set so as not to be overlapped with the keys of the keypad, while a cursor for selecting a key can be displayed on the keypad. In that case, the cursor may be moved by sliding the user's finger within the operating zone.

Alternatively, the operating zone may be superimposed on the keypad and include a portion of the keypad's keys, and in this case, one can perform sliding touch in respective directions within the operating zone, so that keys from the keypad may move in the direction of the sliding touch while the operating zone remains in a fixed position. By using the above technique, the user may perform the sliding touch within the operating zone so as to allow a desired key to be included in the operating zone. Once the desired key is included in the operating zone, it may be selected by means of clicking or removing/releasing the finger after selecting the desired key, etc.

The display unit 20 may be configured to display, on a touch screen, a keypad and the operating zone. Specifically, the display unit 20 may arrange the keypad and the operating zone in accordance with size and position settings that are obtained from operating zone setting unit 10. When the operating zone setting unit 10 adjusts the size and position of the operating zone, the display unit 20 may adjust the manner in which the operating zone is displayed on the touch screen accordingly.

The sensing unit 30 (or processor thereof) may be configured to receive user input in the operating zone. Specifically, the sensing unit 30 may sense (or receive) respective touch operations performed by the user on the touch screen, such as clicking, sliding, long pressing, flicking, etc., and in this case, the sensing unit 30 may accordingly obtain various related characteristics of the touch operations, such as a position of a touch point, a distance of a movement, duration of a movement, etc.

The control unit 40 (or processor thereof) may be configured to determine key selections made by the user. Specifically, the control unit 40 may be configured to associate keys on the keypad with user operations performed within the operating zone. For example, when the operating zone is set so as not to be overlapped with the keys of the keypad, and a cursor for selecting a key is displayed on the keypad, control unit 40 may identify key selections by monitoring sliding actions (or other types of actions) that are performed by the user within the operating zone.

Additionally or alternatively, when the operating zone is set to be overlapped with the keypad and include part of the keys in the keypad, as the user performs sliding touch in respective directions within the operating zone, the control unit 40 may allow the entire keypad to move towards the corresponding respective directions, thus changing the keys included in the operating zone, and allowing the user to select the desired key in the operating zone by means of clicking, etc.

Additionally or alternatively, in some implementations, the keypad input apparatus as shown in FIG. 3 may perform a switch between the one-handed operation mode and the two-handed operation mode. The manner in which the switch is performed is discussed further below.

Figure 4A:
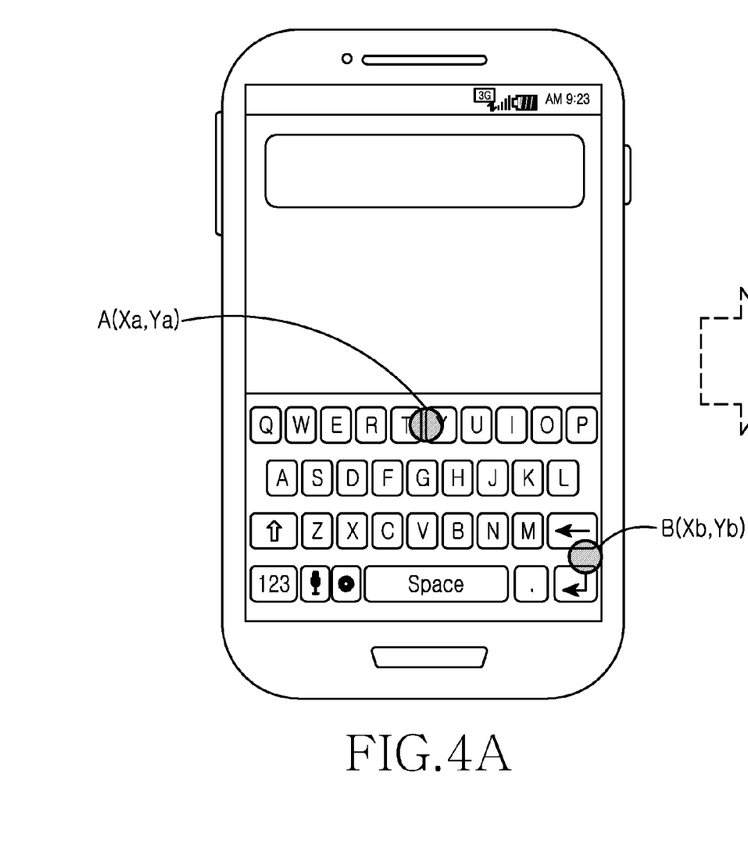
FIGS. 4A and 4B are schematic diagrams depicting the operation of a portable terminal in accordance with some aspects of the disclosure.
Figure 4B:
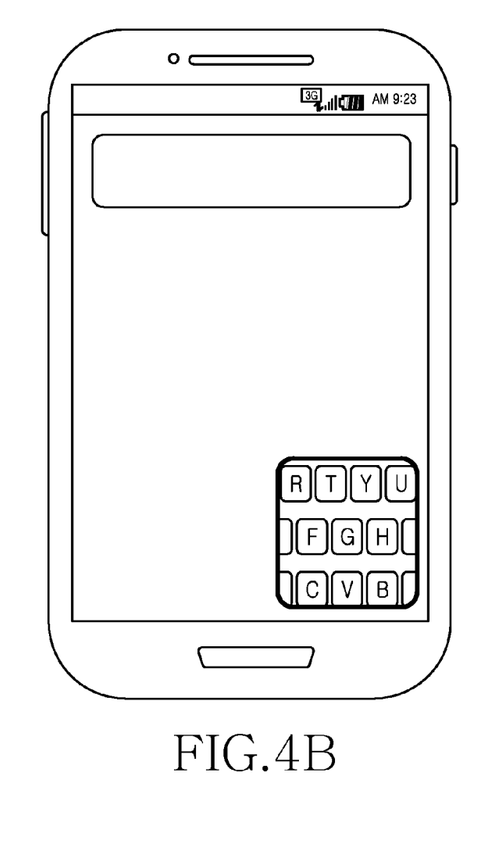

FIGS. 4A and 4B depict schematic diagrams that illustrate a technique for performing an operating mode switch in accordance with aspects of the disclosure. In particular, FIG. 4A depicts a terminal in a two-handed operation mode and FIG. 4B depicts the same terminal after a switch to a one-handed operation mode has been performed. In some aspects, the terminal may be in a one-handed operation mode when it provides the user with an operating zone that is substantially accessible with a single finger (e.g., the user's right thumb) and permits the user to enter any of the keys on a virtual keypad that is otherwise not substantially accessible with a single finger. For example, in some implementations, the user can transition the terminal to the one-handed operation mode by performing a straight line sliding motion within the keypad area.

As shown in FIG. 4A, assuming the top-left corner of the screen is an origin, and a start point pressed by a user's finger is point A, a sliding motion may be performed by sliding the user's finger from point A to point B within a predetermined time T_limit. For example, if the sensing unit 30 determines that the sliding distance exceeds a certain threshold D_min, and the x-coordinate of point A is at the left of the x-coordinate of point B (Xa<Xb), and the y-coordinate of point A is located above the y-coordinate of point B (Ya<Yb), then the operating zone setting unit 10 may activate the operating zone of the keypad, so as to enter into one-handed operation mode as shown in FIG. 4-(b). Additionally or alternatively, after entering into the one-handed operation mode, the sensing unit 30 may return to the two-handed operation mode in response to detecting a similar sliding motion. In that regard, the sliding motion may be used to toggle between the one-handed operation mode and the two-handed operation mode.

It should be noted that various gestures may be used to transition the terminal from two-handed operation mode to the one handed operation mode. The example of using a quick straight line touch action as an operation mode switching instruction will not limit the scope of the disclosure as various modifications may be conceived by those skilled in the art. In that regard, the switch between the one-handed operation mode and the two-handed operation mode may be based on at least one of a distance, a direction, a time duration, and or any other suitable characteristic of a touch. Additionally or alternatively, in some implementations, a virtual key or a fixed key can also be used to perform the switch between one-handed and two-handed operation mode.

Figure 5:
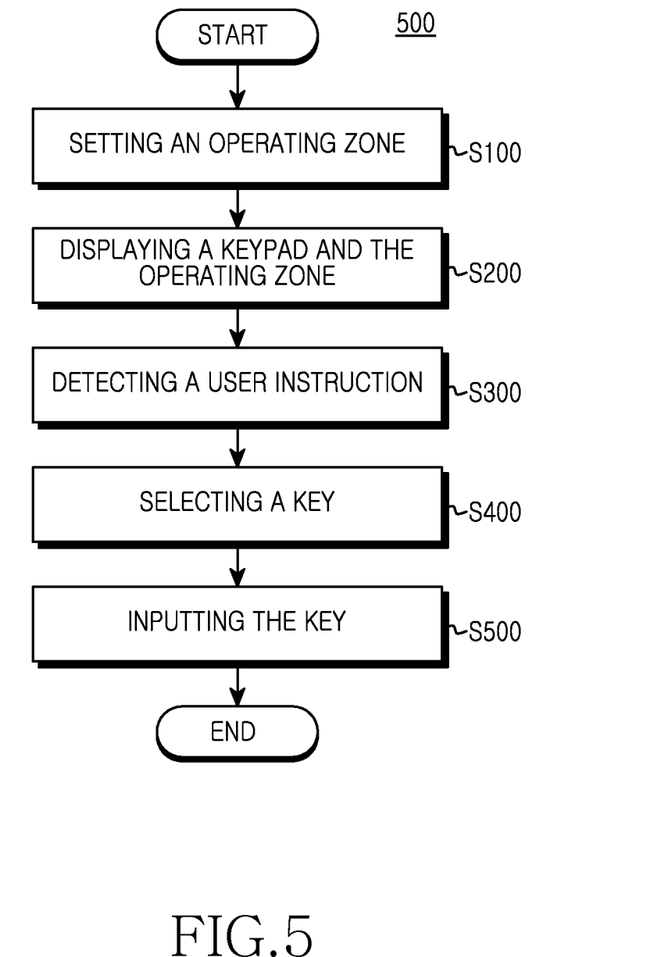
FIG. 5 is a flowchart of a process for performing keypad input in a portable terminal in accordance with some aspects of the disclosure.

FIG. 5 depicts a flowchart of a process 500 in accordance with some aspects of the disclosure. One or more of the steps of process 500 may be performed by a processor (e.g., and x86 or ARM processor) or another terminal component. In step S100, an operating zone for operating a keypad is set on a touch screen of a terminal, wherein the size of the operating zone is configured so that the user is allowed to slide his thumb conveniently therein. In some implementations, the size and position of the operating zone can be set according to input provided by the user.

In step S200, a keypad is displayed on the touch screen of the terminal along with the operating zone set for operating the keypad. In some implementations, the location on the touch screen where the operating zone is displayed may be specified manually by the user.

In step S300, a user operation performed in the operating zone is detected. For example, the operations performed by the user may include various touching actions, such as clicking, sliding, long pressing, flicking, and/or any other suitable type of operation or gesture. Additionally or alternatively, various characteristics of the operation may be identified, such as a position of a touch point, a distance of a movement, duration of a movement, etc.

In step S400, a key from the keypad is selected based on the user operation performed in the operating zone. In some implementations, the key may be identified or selected based on the type of the operation detected at step S300. Additionally or alternatively, in some implementations, the key may be identified based on a characteristic of the operation. In that regard, the user operation within the operating zone may be effectively associated with the selection for the keys on the entire keypad, so that the user can achieve the selection on the keys of the entire keypad accordingly when he performs the user operation within the operating zone.

In step S500, the selected key is input when the finger is released from the touch screen. In some implementations, inputting the key may include storing a code corresponding to the key into a memory location used by software (e.g., a web browser) to receive user input.

Hereinafter an example of performing the keypad input according to some aspects of the disclosure will be described in conjunction with FIGS. 6-7.

Figure 6:
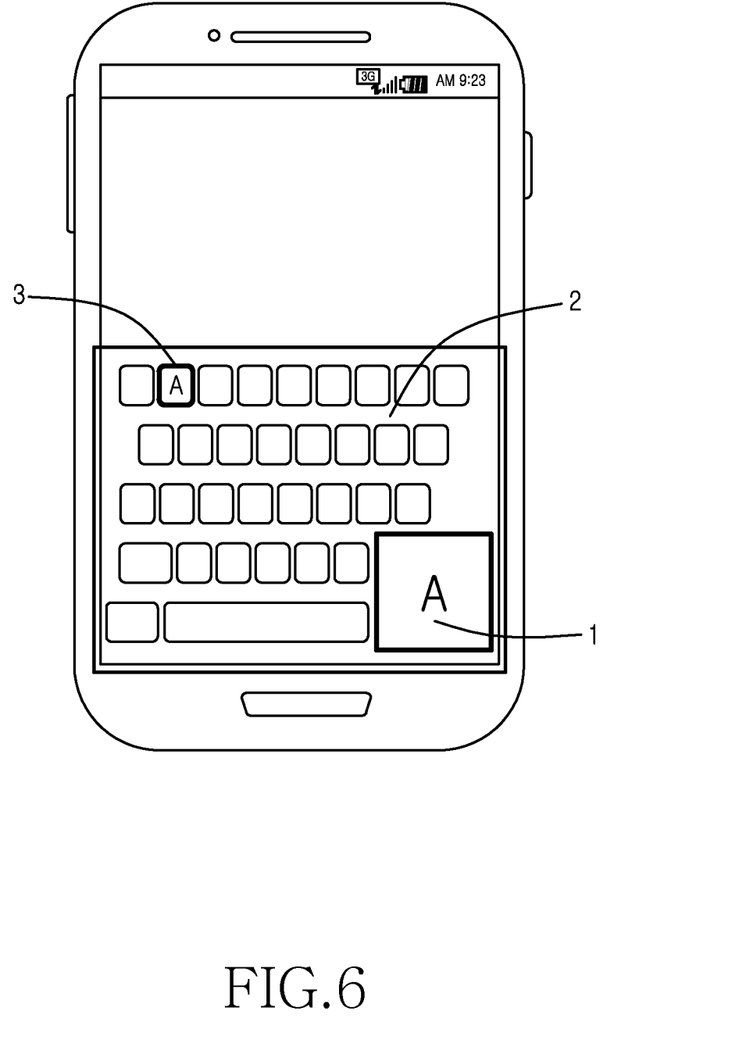
FIG. 6 is a schematic diagram depicting the operation of a portable terminal in accordance with some aspects of the disclosure.

In the example shown in FIG. 6, the position of the operating zone 1 is set at the bottom-right side of the touch screen in order to permit the user to perform touch operation in the operating zone by using the thumb of his or her right hand. As shown, the operating zone 1 can be set so as to not overlap with the keys of the keypad 2. A cursor 3 for selecting a key can be displayed on the keypad 2. A conventional QWERTY standard keypad can be modified simply so as to be adapted to the operating zone 1.

In this example, when the user performs a sliding gesture in the operating zone, the cursor can be made to move in the keypad 2 according to the sliding gesture trajectory in the operating zone 1. For example, the cursor may be moved in a direction that is based, at least in part, on the direction of the sliding gesture, so as to select another key in the keypad 2. The key highlighted may be automatically input right after the releasing of the sliding gesture. Or, the key highlighted may be input according to an additional tapping or clicking on the operating zone 1. Moreover, in some embodiments, as shown in FIG. 6, the key highlighted by the cursor 3 may be may be correspondingly displayed in the operating zone 1 thereby providing the user of the terminal with a further indication of what key is currently selected.

Figure 7:
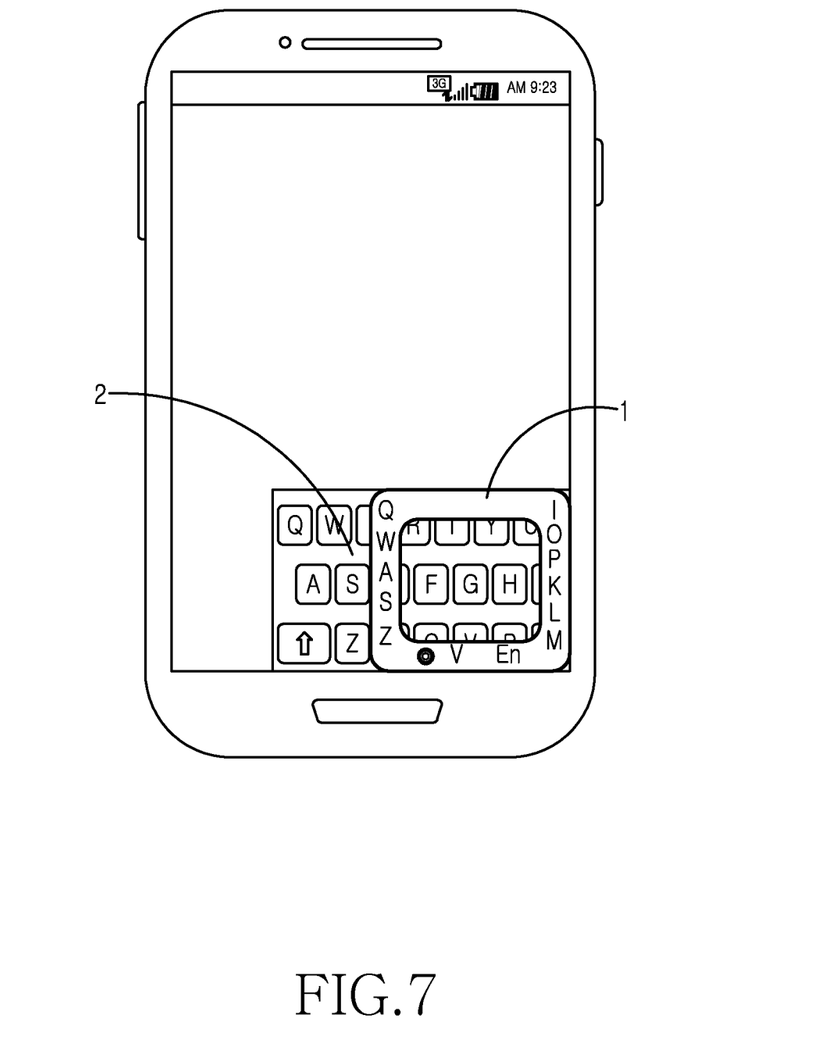
FIG. 7 is a schematic diagram depicting the operation of a portable terminal in accordance with some aspects of the disclosure.

In the example shown in FIG. 7, the operating zone 1 may be set at the bottom-right side of the touch screen, so that it overlaps, at least partially, with the keypad 2. Moreover, as illustrated, the operating zone 1 may include one or more of the keys that are part of the keypad 2. In some implementations, a portion of the keypad 2 can be displayed within the operating zone 1. When a desired key (e.g. the key G) is displayed in the operating zone 1, the user can select the desired key for input by clicking on it. In some aspects, the operating zone 1 may have a circular shape, a rectangular shape, or any other suitable shape.

Additionally or alternatively, in some implementations, the operating zone 1 may include a frame having edges and an interior portion. Prompt characters from keypad 2 can be displayed on the edges of the operating zone 1. In addition, another plurality of characters from the keypad 2 may be displayed in the interior portion of the operating zone 1. As illustrated in FIG. 7, the interior of the operating zone 1 includes the characters F, G, H, and the frame may include the characters Q, W, A, S, Z, V, I, O, P, K, L, and M.

In some aspects, the user may change the characters displayed in the interior of operating zone 1 by performing a sliding touch or another similar gesture within operating zone 1. For example, as shown in FIG. 7, the characters I, O, P, K, L, M are displayed on the left side of the frame, which indicates that if the user performs the sliding towards the left direction within the operating zone, then the above characters I, O, P, K, L, M will be included in the interior of the operating zone. As noted above, once a character is included in the interior of the operating zone, the user may select this character by clicking on it (e.g., with his or her thumb).

Additionally or alternatively, in some implementations, the operating zone 1 can be made translucent in order to reveal keys that are located underneath the operating zone 1.

The above-described embodiments according to the present disclosure can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The above embodiments of the present invention are only exemplary embodiments, and the present invention is not limited to said embodiments. Those skilled in the art should understand the exemplary embodiments can be changed without deviating from the principle and spirit of the present invention, the scope of which is defined by the claims and the equivalents thereof.

What is claimed is:

1. A method for performing a keypad input operation in a portable terminal using a single hand, the method comprising:

displaying a keypad and an operating zone which has an interior portion and at least one edge around the interior portion and is placed at a particular location configured to allow one finger to substantially reach over the keypad; and displaying a plurality of keys from the keypad as prompt characters on the edge of the operating zone, wherein the displaying the plurality of keys comprising:

changing a location of the prompt characters to the interior portion from the edge when a sliding touch is detected in the operating zone; and displaying the prompt characters in the interior portion.

2. The method of claim 1, wherein the operating zone is displayed at a bottom-right side or a bottom-left side of a touch screen.

3. The method of claim 2, wherein the operating zone is overlapped on the keypad.

4. The method of claim 3, further comprising:

moving the keypad to a direction of a sliding touch detected in the operation zone.

5. The method of claim 1, wherein the displaying the plurality of keys comprising:

displaying the plurality of keys located externally of the operating zone on the edge of the operating zone.

6. The method of claim 5, wherein the displaying the plurality of keys comprising:

changing an arrangement of the plurality of keys on the edge of the operating zone.

7. The method of claim 1, wherein the operating zone is displayed in a translucent state.

8. A portable terminal comprising,
a touch screen; and
a processor controlling the touch screen to:

display a keypad and an operating zone which has an interior portion and at least one edge around the interior portion and is placed at a particular location configured to allow one finger to substantially reach over the keypad; and display a plurality of keys from the keypad as prompt characters on the edge, wherein the processor configured to change a location of the prompt characters to the interior portion from the edge when a sliding touch is detected in the operating zone and to display the prompt characters in the interior portion.

9. The portable terminal of claim 8, wherein the operating zone is displayed at a bottom-right side or a bottom-left side of the touch screen.

10. The portable terminal of claim 9, wherein the operating zone is overlapped on the keypad.

11. The portable terminal of claim 10, wherein the processor is further configured to move the keypad to a direction of a sliding touch detected in the operation zone.

12. The portable terminal of claim 8, wherein the processor configured to display the plurality of keys located externally of the operating zone on the edge of the operating zone.

13. The portable terminal of claim 12, wherein the processor configured to change an arrangement of the plurality of keys on the edge of the operating zone.

14. The portable terminal of claim 8, wherein the operating zone is displayed in a translucent state.

* * * * *